UNITED STATES PATENT OFFICE.

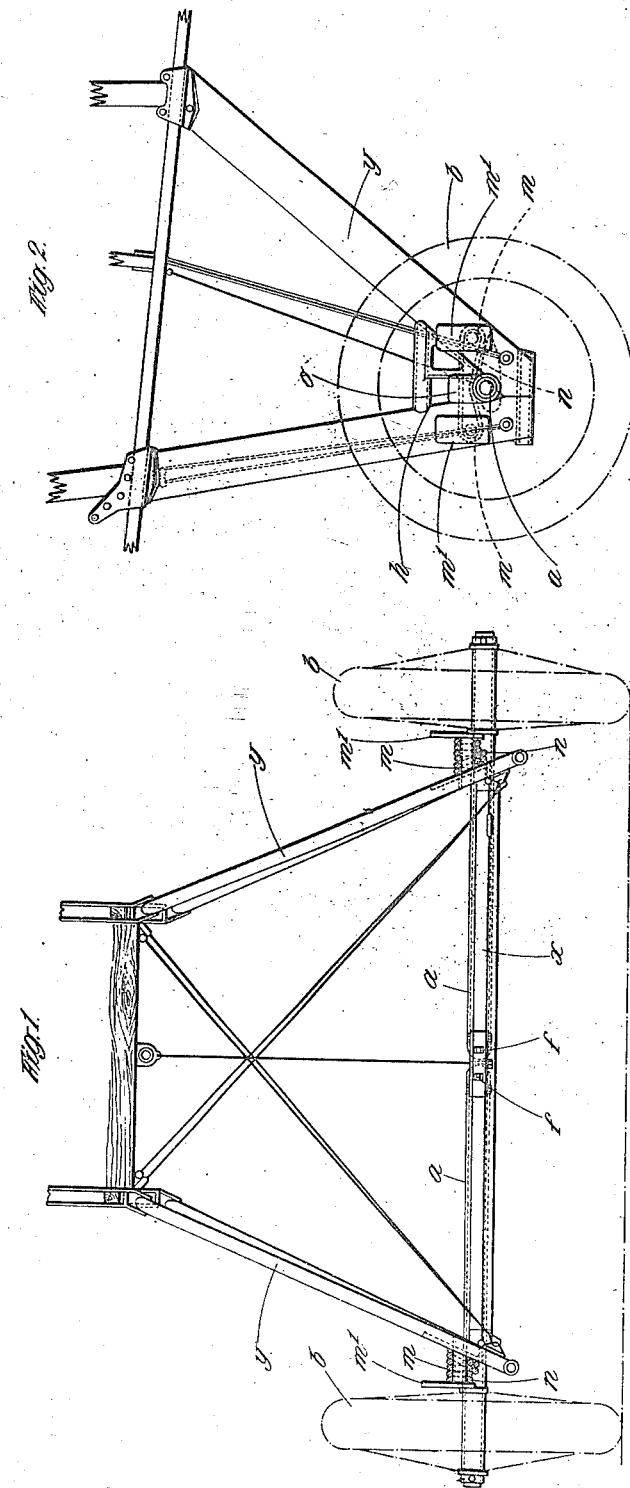

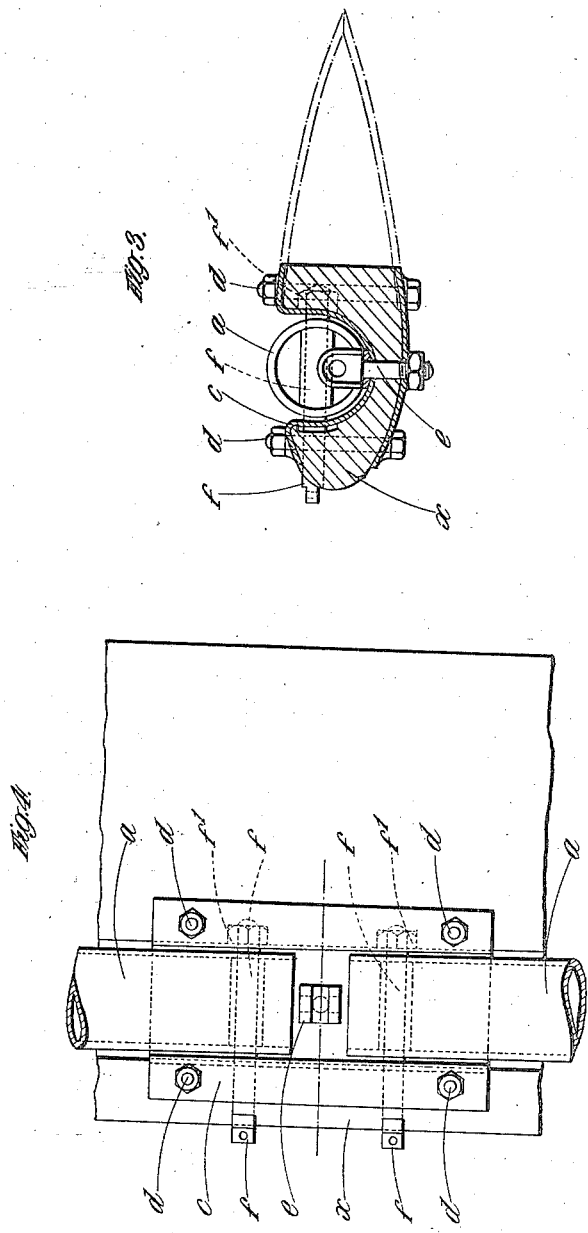

THOMAS SOPWITH, OF KINGSTON-ON-THAMES, ENGLAND.

LANDING-CHASSIS OR UNDER-CARRIAGE OF AEROPLANES AND THE LIKE.

1,239,736.

Specification of Letters Patent.

Patented Sept. 11, 1917.

Application filed May 12, 1917. Serial No. 168,292.

*To all whom it may concern:*

Be it known that I, THOMAS SOPWITH, a subject of the King of Great Britain and Ireland, residing at Kingston-on-Thames, in the county of Surrey, England, have invented certain new and useful Improvements in and Relating to the Landing-Chassis or Under-Carriages of Aeroplanes and the like, of which the following is a specification.

This invention relates to the landing chassis or under-carriages of aeroplanes and the like, and it consists of an improved construction and arrangement of axle for carrying the wheels of said chassis or under-carriage, the object being to absorb more perfectly and completely the shocks set up when an aeroplane or the like is landing.

We attain this end by the construction illustrated in the accompanying drawing in which:—

Figure 1 is a broken view in front elevation of the landing chassis or under-carriage, Fig. 2 is a broken view in side elevation thereof, and Figs. 3 and 4 are views on an enlarged scale in transverse section and broken plan respectively showing the method of pivoting the ends of the two parts of the axle carrying the wheels.

Throughout the views similar parts are marked with like letters of reference.

The axle $a$ carrying the wheels $b$ $b$ is formed in two parts the adjacent inner ends of which are pivoted to the lower transverse member or spar $x$ of the landing chassis or under-carriage. This member or spar is preferably grooved as shown to enable the two parts of the axle to lie within it so as to reduce the head resistance, and said spar is preferably made of stream-like form as shown. At or about the center of the member or spar $x$ is mounted a plate $c$ which conforms to the shape of the groove in said member or spar, and said plate is fixed in position by means of suitable bolts $d$. In the center of this plate is mounted an eye bolt $e$ to which the cable supporting the member or spar $x$ is attached. Mounted in the member or spar $x$ on each side of the eye bolt $e$ are pins $f$ on which the inner ends of the two parts of the axle $a$ are pivoted so as to enable their outer ends carrying the landing wheels to move through a vertical arc in relation to the chassis or under-carriage. The pins $f$ are threaded into nuts $f^1$ brazed or otherwise fixed on or formed in the plate $c$, and suitable flats or the like are formed on the outer ends of said pins to provide means whereby they can be rotated, said flattened ends being provided with holes through which a length of wire can be threaded for the purpose of mutually locking the pins to one another and so prevent them from becoming accidentally unscrewed.

The outer ends of the two parts of the axle $a$, on which the wheels $b$ are mounted, pass between the two members of the V-shaped side frames $y$ of the chassis or under-carriage and normally lie in the inverted apices of said frames, a suitable guide piece $h$ being provided on each side member to guide the two parts of the axle in their relative movements in relation to said frames and to take the thrust set up by said axle. On each member of the side frames $y$ of the chassis or under-carriage is fixed a stud or boss $m$ having an exterior flange $m^1$. These studs or bosses are arranged opposite to one another on each side of the axle $a$ and may be provided with loose spools or rollers. Around each of the two studs or bosses $m$ $m$ on the members of each of the side frames $y$ is wound a cord $n$ of rubber or other suitable elastic material which forms an elastic bridge, the position of the two parts of the axle $a$ in relation to said elastic bridges being such that the under side of each of said bridge rests on one part of the axle either directly or through the medium of a loosely mounted spool or roller thereon and operates to press it down into the inverted apex of the frame so that when the aeroplane is on the ground the weight of the front part of it is borne by the two elastic bridges. If desired, vertically arranged flanges $o$ may be provided on the axle to retain the elastic windings in their proper lateral positions, and the length of the flanges $m^1$ extending upward is such that they will operate to confine the elastic windings forming the bridges against lateral movement through any arc through which either part of the axle $a$ can move.

What I claim as my invention, and desire to secure by Letters Patent is:—

1. A landing chassis or under-carriage for aeroplanes and the like comprising two V-shaped side frames, a lower member or spar connecting said side frames, a two-part axle the inner ends of the two parts of which are pivoted to the lower member or spar at the center thereof and the outer ends of which pass between the two members of the V-shaped side frames, vertical guides for said two-part axle said guides being mounted in the apices of the two V-shaped side frames, landing wheels loosely mounted on the outer ends of the parts of said axle exterior to the side frames, two studs or bosses mounted on the outer side of each side frame, and an elastic bridge carried by and formed between each pair of said studs or bosses each said elastic bridge being adapted to contact and support one half of the axle.

2. A landing chassis or under-carriage for aeroplanes and the like comprising two V-shaped side frames, a lower member or spar connecting said side frames, a two-part axle the inner ends of the two parts of which are pivoted to the lower member or spar at the center thereof, landing wheels loosely mounted on the outer ends of the parts of said axle exterior to the side frames, two studs or bosses mounted on the outer side of each side frame, flanges carried by said studs or bosses, an elastic bridge carried by and formed between each pair of said studs or bosses and adapted to contact and support one half of the axle, and flanges carried by the two parts of the axle adjacent to the points of contact of the elastic bridges.

3. A landing chassis or under-carriage for aeroplanes and the like comprising two V-shaped side frames, a lower member or spar connecting said side frames, a two-part axle the inner ends of the two parts of which are pivoted to the lower member or spar, landing wheels loosely mounted on the outer ends of the parts of said axle exterior to the side frames, two studs or bosses mounted on the outer side of each side frame, flanges carried by said studs or bosses, spools or rollers mounted on said studs or bosses, an elastic bridge carried by and formed between each pair of said studs or bosses and adapted to contact and support one half of the axle, flanges carried by the two parts of the axle adjacent to the points of contact of the elastic bridges, and spools or rollers on the two parts of the axle at the points where same contact the elastic bridges.

4. In a landing chassis or under-carriage for aeroplanes and the like comprising two V-shaped side frames, a lower member or spar connecting said side frames, transverse pins carried by said lower member or frame, a two-part axle the inner ends of the two parts of which are pivoted to the transverse pins carried by the lower member or spar, landing wheels loosely mounted on the outer ends of the parts of said axle, an attachment for the cable supporting the lower member or spar located between the two parts of the axle, a vertical guide plate carried by each side frame, two studs or bosses mounted on the outer side of each side frame, flanges carried by said studs or bosses, spools or rollers mounted on said studs or bosses, an elastic bridge carried by and formed between each pair of said studs or bosses and adapted to contact and support one half of the axle adjacent to one of the landing wheels, flanges carried by the two parts of the axle adjacent to the points of contact of the elastic bridges, and spools or rollers on the two parts of the axle at the points where same contact the elastic bridges.

5. In a landing chassis or under-carriage for aeroplanes and the like, the combination of two V-shaped side frames, a lower member or spar connecting said side frames, transverse pins carried by said lower member or frame, a two-part axle the inner ends of the two parts of which are pivoted to the transverse pins carried by the lower member or spar, landing wheels loosely mounted on the outer ends of the parts of said pins, means for locking the pivotal pins to one another, a vertical guide plate carried by each side frame, two studs or bosses mounted on the outer side of each side frame, flanges carried by said studs or bosses, spools or rollers mounted on said studs or bosses, an elastic bridge carried by and formed between each pair of said studs or bosses and adapted to contact and support one half of the axle adjacent to one of the landing wheels, flanges carried by the two parts of the axle adjacent to the points of contact of the elastic bridges, and spools or rollers on the two parts of the axle at the points where same contact the elastic bridges.

6. In a landing chassis or under-carriage for aeroplanes and the like, the combination of two V-shaped side frames, a lower member or spar of a channel section connecting said side frames, a channel-shaped plate fixed in the center of the lower member or spar, transverse pins screwed into nuts or the like formed on or carried by said plate, a two-part axle the inner ends of the two parts of which are pivoted to the transverse pins carried by the lower member or spar, landing wheels loosely mounted on the outer ends of said axle, means for locking the pivotal pins, a vertical guide plate carried by each side frame, two studs or bosses mounted on the outer side of each side frame, flanges carried by said studs or bosses, and an elastic bridge carried by and formed between each part of said studs or bosses and adapted to contact and support one half of the axle adjacent to one of the landing wheels.

7. In a landing chassis or under-carriage for aeroplanes and the like, the combination of two V-shaped side frames, a lower member or spar of a channel section connecting said side frames, a channel-shaped plate fixed in the center of the lower member or spar, transverse pins carried by said plate, a two-part axle the inner ends of the two parts of which are pivoted to the transverse pins carried by the lower member or spar, landing wheels loosely mounted on the outer ends of said axle, an attachment for the bracing medium of the lower member or spar located between the two parts of the axle, a vertical guide carried by each side frame, two studs or bosses mounted on the outer side of each side frame, flanges carried by said studs or bosses, spools or rollers mounted on said studs or bosses, an elastic bridge carried by and formed between each pair of said studs or bosses and adapted to contact and support one half of the axle adjacent to one of the landing wheels, flanges carried by the two parts of the axle adjacent to the points of contact of the elastic bridges, and spools or rollers on the two parts of the axle at the points where same contact the elastic bridges.

8. In a landing chassis or under-carriage for aeroplanes and the like the combination of two V-shaped side frames, a lower member or spar of a channel section connecting said side frames, a channel-shaped plate fixed in the center of the lower member or spar, transverse pins carried by said plate, a two-part axle the inner ends of the two parts of which are pivoted to the transverse pins carried by the lower member or spar, landing wheels loosely mounted on the outer ends of said axle, an attachment for the bracing medium of the lower member or spar located between the two parts of the axle, a vertical guide carried by each side frame, two studs or bosses mounted on the outer side of each side frame, flanges carried by said studs or bosses, spools or rollers mounted on said studs or bosses, an elastic bridge carried by and formed between each pair of said studs or bosses and adapted to contact and support one half of the axle adjacent to one of the landing wheels, flanges carried by the two parts of the axle adjacent to the points of contact of the elastic bridges, and spools or rollers on the two parts of the axle at the points where same contact the elastic bridges.

In testimony whereof I have signed my name.

THOMAS SOPWITH.

Witnesses:
  H. P. MUSGRAVE,
  S. E. GOODENOUGH.